United States Patent
Stewart

[15] 3,702,067
[45] Nov. 7, 1972

[54] FORCE TRANSMISSION AND APPARATUS

[72] Inventor: James M. Stewart, West Palm Beach, Fla.

[73] Assignee: Stewart Research, Inc., West Palm Beach, Fla.

[22] Filed: Nov. 4, 1969

[21] Appl. No.: 873,976

[52] U.S. Cl. ..........................................64/27, 32/26
[51] Int. Cl. ................................................F16d 3/00
[58] Field of Search ..............64/11, 26, 27 NM, 54.5

[56] References Cited

UNITED STATES PATENTS 3,557,573   1/1971   Hansgen..................64/27 NM
3,521,464   7/1970   Kidey......................64/27 NM

*Primary Examiner*—Edward G. Favors
*Attorney*—Finnegan, Henderson, Farabow & Garrett

[57] ABSTRACT

The disclosure hereinafter set forth relates to force transmission in any environment. As an essential element in the working force system a substantially noncompressible, nonfluid, but readily deformable gel is employed. In such force transmission, the gel is deformed within a confining but variable zone, and the resulting thrust is translated to force receiving means. The disclosure has wide application and the specific illustration relates to dental and/or surgical type power operated handpieces.

2 Claims, 2 Drawing Figures

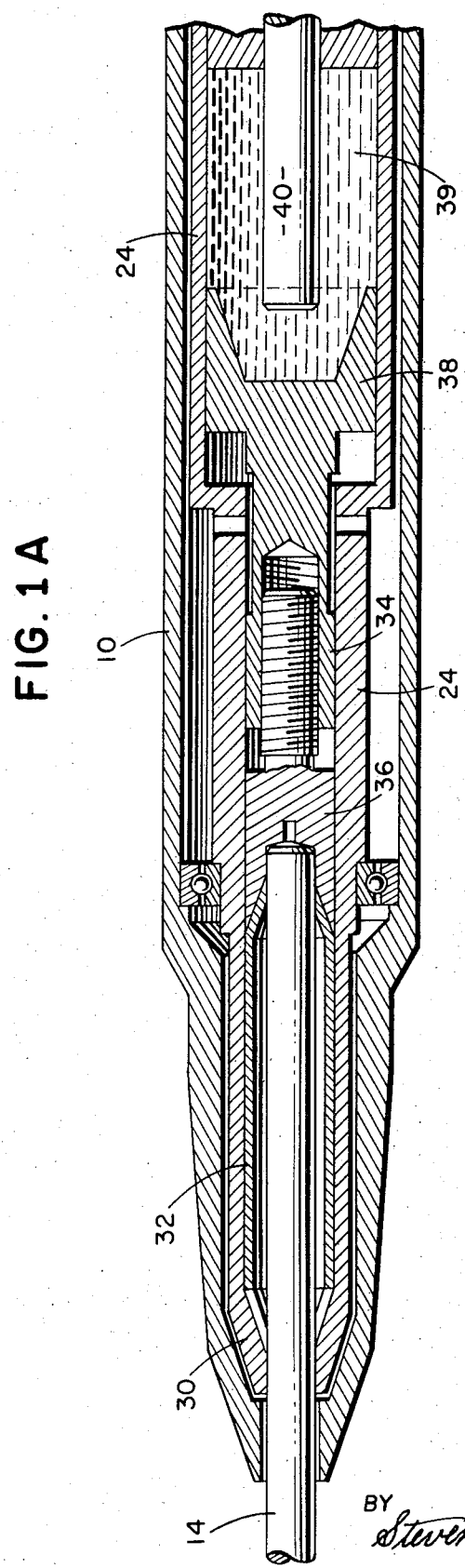

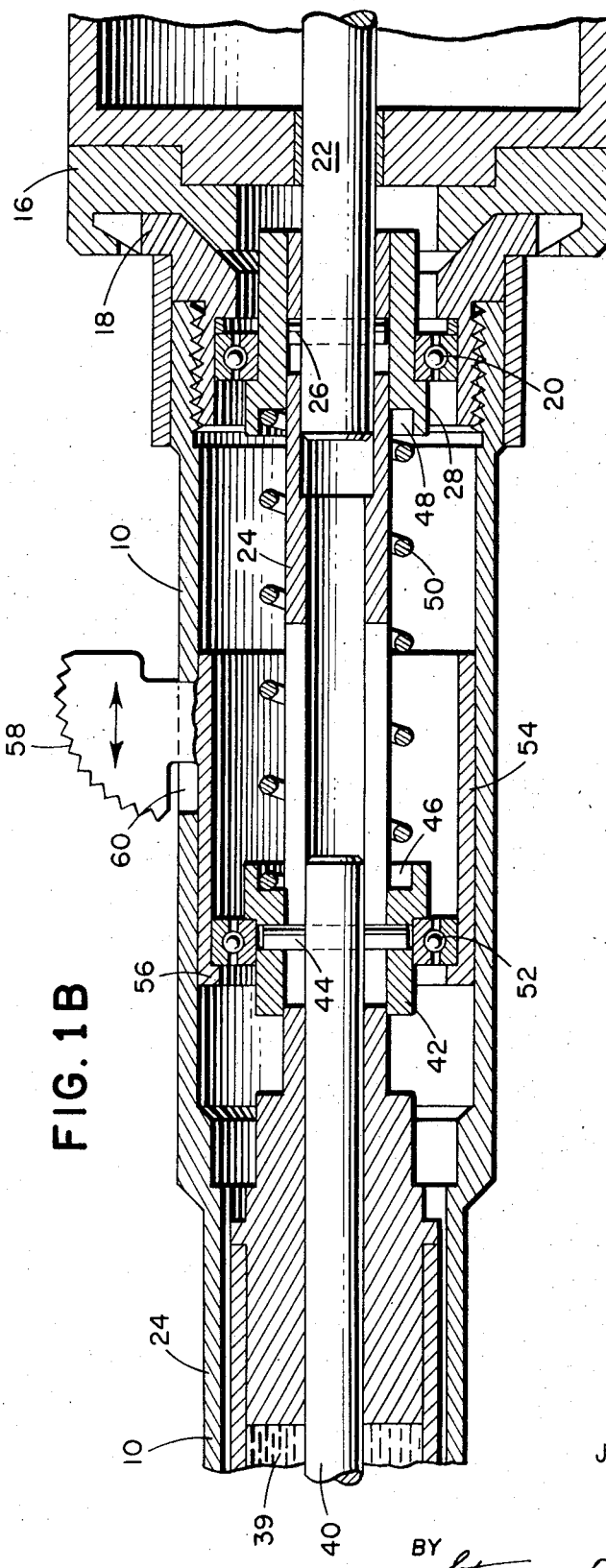

FORCE TRANSMISSION AND APPARATUS

This invention is concerned with force transmission. Although this invention is described and illustrated in relation to dental tools, such as powered drills, polishers, etc., it has much wider application in principle, as will be appreciated upon considering the novel and useful specific utilization in such equipment.

This invention involves the new and useful application of materials known as "gels" as a force transmitting means. Within the present invention the term "gel" indicates noncompressible materials which perform, as herein utilized, as a solid in the respect of their force transmission, and somewhat as a resilient material, such as rubber, in that their content is mobile or displaceable in all directions, yet capable of returning to a state of repose and continuity when the applied force is relaxed or applied in another direction, or by a different means. The materials themselves may be visualized as being much like a fruit jelly of tough character, or like common Jello; yet in use their internal particle to particle adherence is much higher, thus inherently having the tendency to hold strongly together as a unified mass. As aforesaid, the materials contemplated herein are non-fluid and non-compressible; however, their interparticle-to-particle tenacity may range from relatively weak to very strong while remaining useful in the invention. The invention is described in relation to a particular type of gel, but any similar character gel may be employed, as should be apparent.

In producing useful tools, or work accomplishing devices, many practical considerations are constantly prominent. Apparatus which involves several coacting, interrelated or interfitting moving parts almost invariably suffers from the disadvantages of heat generation, rapid parts wear, followed by more heat and noise production, gradually degrading operating efficiency, parts breakage, increasing costs in the overall process, equipment downtime, etc. These disadvantages are constantly sought to be overcome by parts elimination, higher quality materials, closer tolerances, lubrication, cooling, product quality compromise, etc., all of which are well known.

Where equipment such as dental tools are involved, the economic aspect is reflected seriously by the increasing problem of tool wear and obsolescence, since initially such tools, being in the nature of surgical instruments, are expensive, and are used by highly skilled professionals who demand above the ordinary level of quality and performance. However, in all apparatus, these factors are present in high degree; and where safety is a factor, either in local or private installations, or where the public at large is involved, as in the case of automobiles or any such apparatus produced for wide usage, these matters are not any less important, viewed in relation to the considerations peculiar to each. Yet each form of apparatus, due to its peculiar acceptability demands, normal according to each situation, usually enjoys an advance in some degree when a step forward is made that serves to alleviate any fundamental or inherent apparatus-degrading factor, even though the advance may occur in relation to a specific tool or machine. The improvement afforded by this invention is seen to have very wide applicability, and it is not, as should be apparent, confined to tools of the kind illustrated herein. The invention extends to substantially all areas of force application.

The present invention constitutes an improvement in the art of interrelating apparatus parts wherein for a host of reasons, arising out of a host of different apparatus types, it is necessary to transmit a moving force from one point in an apparatus to another. The invention is particularly useful where it is desirable to disengage the force from its working means according to some requirement. In the present invention, the requirement matters little, or not at all, since the invention is useful regardless of time-disengagement demands, whether periodic or purely at-will-demand.

In a general sense, the present invention has utility or applicability in apparatus or systems wherein hydraulic fluids have been employed in force transmission. Moreover, wherever applicable in lieu of such fluids, the present invention affords outstanding advantages; but it is not restricted to use merely as a replacement for such fluids because the present invention is highly useful in systems where fluids are not useful or at least not acceptably so. Dental tools provide one example of this fact, because fluid containment against leakage within the tool, to the high extent which is very essential, requires parts quality and parts tolerance factors of such high standard as practically to be beyond consideration, either economically or, in fact, operably. For example, when parts wear even slightly, oil or fluid seepage appears either on the hands of the dentist or in the mouth of the patient and contaminates the surgical field. When this occurs, an expensive tool must be discarded, or expensively repaired. Moreover, such fluids are usually corrosive and therefore tool cleaning is a problem. Therefore, dental tools, such as drills, which involve relatively complex associations of many moving parts provide an excellent example for illustrating this invention. The many moving parts generate considerable heat and noise due to the present manner of parts association in providing rotary movement of the work piece, and also axial movement of certain other parts, which are also rotary.

The aforementioned gels transmit force as effectively as do either fluids or mechanical parts; yet, such gels do not flow as fluids. Rather, they are of such a nature as to undergo reshaping, such, as when an element penetrates into the gel volume or as when pressured by an element entering a volume occupied by the gel. To illustrate this, consideration may be given to an assembly such as a cylinder and piston in which the gel material occupies the volume adjacent to the piston. If then the gel is confined at the open end of the cylinder by a confining means which also permits passage therethrough of a penetrating shaft into the body of the gel, it will be immediately understood that the latter means can penetrate into the solid gel only if the volume of the cylinder is enlarged. This is obvious since two solid materials cannot occupy the same space at the same time. Pistons are normally movable within their confining cylinders; and if the force applied to the means entering the gel body is sufficiently high, entry of such means into the gel is permitted by movement of the piston. The confined gel has the property of reshaping itself under pressure to the enlarged, or altered, shape and size of the cylinder. Thus, as the force delivering means enters the gel, the gel reshapes itself to the cylinder volume and in doing so, it moves in the direction of the piston. Accordingly, as the force means enters the gel, the piston moves at the same time in response to the reshaping action of the gel.

It is important to note that while hydraulic fluids perform the force transmitting function to the same extent, unrestricted fluid particle movement is permitted by such fluids. In other words it may be said that though a hydraulic fluid may be fairly viscous, indeed it does flow because of its inherent viscosity. In contrast, the gel materials employed in this invention possess no viscosity characteristics applicable herein. Accordingly, the particles of the gel material are not free to move individually (except possibly at very high temperatures and/or pressures) and therefore they cannot detach themselves from the body of the gel and move through minute passageways as can the moving molecules of a hydraulic fluid. By reason of this fact, the use of such gel materials affords great advantage where leakage of such as hydraulic fluids is a matter to be avoided. It is believed to be likely that many apparatuses have continued to use mechanical means for force transmission, especially where the force application is long and strong, because of the difficulty of sealing against leakage, as by expensive parts of close tolerance or as by seals which must be continually replaced.

The gel type material of this invention, at least for purposes herein, may be described as a deformable but noncompressible solid. It may be also mentioned that upon withdrawal of the deforming means, such as the force means discussed above from within the body of the gel, the gel returns to its original shape as established by the confining means. The return to its original shape occurs substantially as rapidly as the displacing means is withdrawn.

Normally, it is desirable that the gel material be produced by an in situ chemical reaction which is carried out within the confining volume in which it is intended to operate as a force transmitting component. This assures that the space will be fully occupied, and therefore that the calculated and needed displacement of a member to be moved will take place.

A specific gel product, especially useful according to this invention, is that which is sold under the Trademark Sylgard 51 Dielectric Gel. The named material is produced by the Dow Corning Corporation, Midland, Michigan, and it is particularly described in their bulletin No. 05-2043 dated Dec. 1967, which bulletin is made a part of this disclosure. According to this bulletin, this particular product is a silicone product which is produced by catalytic action. The silicones are well known materials and they can be produced with a variety of characteristics according to known techniques. By varying the degree of reaction, in the production of Sylgard 51, products may be produced ranging from products which are easily deformable to products which resist deformation strongly. As will be appreciated, any one of these obtainable materials can be employed according to this invention. Of course, as the materials are more resistant to deformation, more force will need to be employed in overcoming such resistance. Usually the more resistant materials are increasingly tolerant of temperature effects and accordingly they afford advantages in higher temperature environments.

Gels which are useful in this invention are described in and may be produced according to the teachings of U.S. Pat. No. 3,020,260 of Feb. 6, 1962. It will be understood that the invention is concerned with gel materials having the general character hereinbefore described and that the invention is not particularly concerned with gel characteristics other than such as may be regarded as functional. Thus, any gel having the functional characteristics applicable to the purposes of this invention may be employed regardless of their chemical content.

As indicated hereinabove, although the teachings of this invention are specifically illustrated with regard to dental type tools, they may be applied in any environment of the type under consideration. For example, the gel may be used in clutch mechanism, brake systems, such as automobiles and otherwise, steering mechanism, presses, etc. One of the most important characteristics of the invention is that the applied force may be transmitted in any number of directions at the same time; also, such force may be transmitted in systems wherein it is desirable to abruptly change the direction of the initially applied force. For example, a force may be delivered to the gel in an axial direction and the direction of the force may be changed to an angle of 90° from the axial force. In other words, when the gel is applied through a 90° bend in a circuit, the force is equally effectively applied through the angle.

The invention herein is illustrated by drawings wherein

FIGS. 1A and 1B show a longitudinal sectional view through a dental tool which may receive any type of workpiece for operation by the tool mechanism.

Referring to the drawings, numeral 10 denotes the outer metal housing of the dental tool. Numeral 12 denotes a driving motor and numeral 14 denotes the driven workpiece. The motor is attached to the housing by means of cooperating elements 16 and 18 providing a bayonet type lock, permitting easy release. Element 18 is a cylindrical piece threading into housing 10 and its inner surface provides a surface for bearing unit 20. Numeral 22 denotes the driving shaft of the motor which is keyed to driven hollow shaft 24 by pin 26. Sleeve 28 supports bearing 20 and tightly frictionally engages shaft 24 for rotation therewith. Shaft 24 extends to the extreme opposite end of the tool as indicated at numeral 30; and within its hollow interior it contains the additional parts for holding the workpiece 14 and effecting its rotation through frictional contact with the interior of shaft 24 at its swaged end 30. The additional part includes (a) collet 32, (b) collet operator 34 which is comprised of two elements 36 and 38 threaded together to permit overall length adjustment, (c) the force transmitting gel material 39 and (d) a piston 40 axially movable into the volume of the gel. Piston 40 is keyed to shaft 24 and sleeve 42 by pin 44 in order that the piston and sleeve rotate with the shaft. Between the sleeves 42 and 28, which are provided with annular flanges 46 and 48, is a spring 50. Spring 50 serves to maintain strong axial pressure on piston 40 via sleeve 42 and pin 44 such pressure effecting the needed constant force on the collet operator whereby, the collet is caused to tightly frictionally grip the workpiece.

Numeral 52 denotes a bearing assembly mounted on the sleeve 42, the inner ring thereof rotating with sleeve 42 by reason of tight frictional engagement and the outer bearing ring being frictionally held within sleeve 54 adjacent the inwardly extending flange 56. Sleeve 54 is also axially slidable and is so moved by hand or thumb actuation via element 58 which extend through the slot 60 in housing 10. Manual axial movement of thumb piece 58 effects compression of spring 50 and therefore its effective force or pressure on the other part in the assembly. Thus, movement of the thumb piece to the right as indicated by the arrow effects withdrawal of piston 40 from the gel material and, accordingly, the force transmitted to the collet is relieved and the workpiece is readily removed.

It is desired to point out that the tool illustrated herein permits removal of the workpiece without stopping the rotation of the motor and assembled parts. Thus, a number of tools, whether dental tools, rotary drills, brushes, etc., may be operated from a common power source and workpieces may be removed from any one of the operating tools while the others are permitted to continue in normal operation.

Reference is now made to a very important advantage not heretofore mentioned in the course of describing this invention. This particular advantage has to do with reduction in the necessary force of the spring of the device by which the internal mechanism is caused to compress the collet structure and strongly grip the working piece. Prior art dental tools of the general type here under consideration have suffered from substantial disadvantage in that stronger spring pressure than desirable usually is necessary, considering the fact that the collet must be released by hand against the spring force. Surprisingly enough such spring pressure does indeed present a problem to the dentist. To some extent the prior art has been able to reduce spring pressure by mechanical elements affording advantage by the well-known principle of leverage. However, the mechanical apparatus employed for this purpose can seldom be positioned in such a fashion as to be perfectly balanced as a matter of concentricity within the tool, and, therefore, considerable vibration is developed, together with noise and heat which, obviously is undesirable. In using the gel of this invention, together with the mechanical elements described hereinbefore, it is possible to employ a relatively weak spring which may be easily released by thumb pressure while, at the same time, sufficient force is delivered at the points of compression of the collet that the working piece is very securely held. The fundamental principle by which such a high degree of mechanical advantage is attained as a result of this invention is known as Pascal's principle, which principle is applicable in hydraulic fluids. As applied to hydraulic fluids, briefly stated, the principle is that an increase in pressure at any point in the liquid results in a like increase at every other point in the liquid. In actual application, upon applying a force of a given magnitude to a small piston, a greater force will be exerted by a larger piston interconnected by a hydraulic fluid. The formula is stated as $F/A = f/a$. By this means a large force, exerted through a small distance may be obtained by exerting a small force through a large distance. Although the present invention does not employ a hydraulic fluid, it is highly advantageous to the present invention that the gel materials respond entirely similar in the respect involving Pascal's principle. As will be seen by observing the drawings, the structure includes a force delivering piston which is quite small in relation to the piston which actually delivers force to the collet. In actual construction, the ratio of the area of the two pistons is 1:10; however, obviously, the invention is not limited to such ratio. This is considered to be an important distinguishing feature of the present invention entirely aside from all of the other advantages heretofore discussed.

As indicated hereinbefore, the invention may be applied in many different environments. Also, the gel force transmission means may be employed in combination with other means, such as hydraulic fluids. For example, a brake system may be provided with a master cylinder containing a quantity of a gel, as described herein, separated from hydraulic fluid in the brake lines by a flexible sealing diaphragm. Each acting slave cylinder may similarly be provided with the gel. Thus, by delivering a force to the gel in the master cylinder, as by means similar to that shown in the drawings and in a similar manner, force is transmitted across or via the diaphragm to the hydraulic fluid in the lines and on to the gels in the slave cylinders. Provision of a movable piston in the slave cylinders, interconnected to actuate the brake shoes, results in a highly improved brake system. As will be understood, as the fluid is displaced by the action in the master cylinder it delivers its force to the diaphragms in the slave cylinders, and thus to the gel on the opposite side, resulting in piston movement. Accordingly, a system is provided which is not subject to dangerous leakage, as normally results in cylinders from wear of the piston-cylinder assembly. In this connection, it will be recalled that the gels do not flow as a liquid. Therefore, even though there be wear in the cylinders, the gel is not subject to leakage.

What is claimed is:

1. An apparatus wherein operating parts are intermittently activated and deactivated in the course of operation comprising force delivering means for supplying a translational force, work means responsive to and utilizing said force to accomplish work, and force transmitting means intermediate the force delivering means and the work means permitting intermittent transfer of the force to the work means comprising:
    a. confining means defining a confining volume between the force delivering means and the work means, and;
    b. a solid, non-fluid, noncompressible but deformable gel fully occupying said confining volume, whereby intermittent applications of translational force applied to the gel by the force delivering means are transmitted through the gel without substantial loss to the work means.

2. The apparatus of claim 1, wherein the force delivering means penetrates into and reshapes the deformable gel within the confining volume of the transmitting means to increase the mechanical advantage of the transmission of the translational force from the force delivering means to the work means.

* * * * *